W. E. ARMISTEAD.
ICE MAKING APPARATUS.
APPLICATION FILED SEPT. 2, 1909.
967,302.
Patented Aug. 16, 1910.
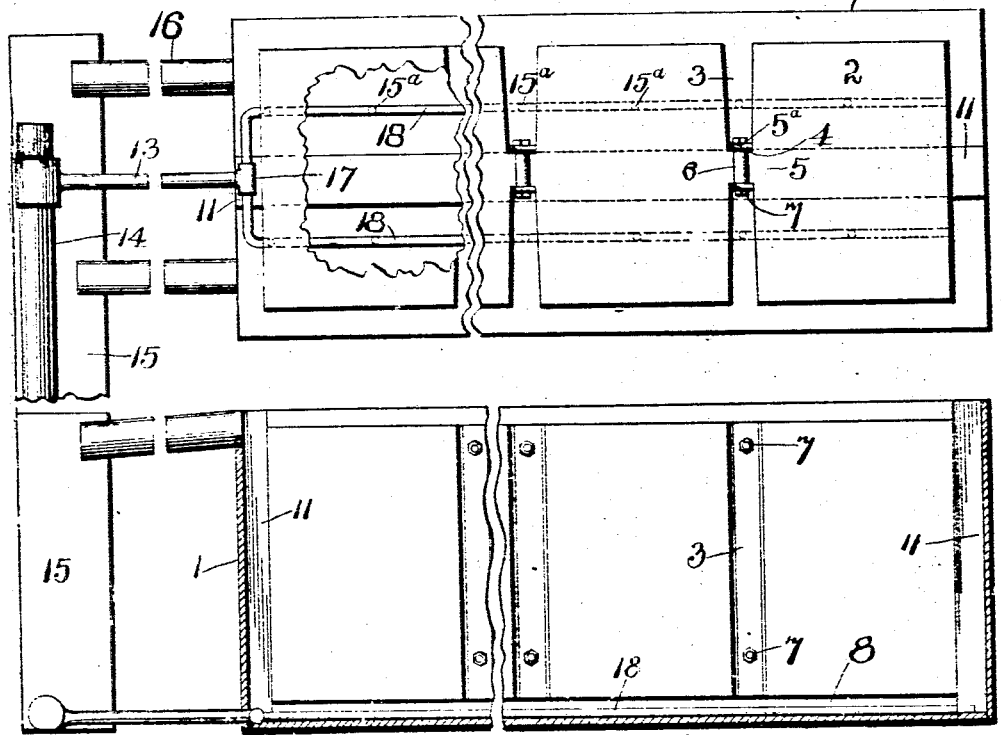
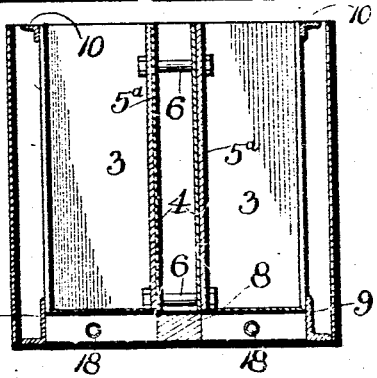
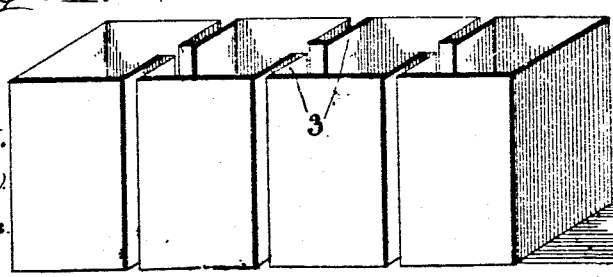
Witnesses.
Byron B. Collings
Jas. E. Dodge
Inventor:
W. E. Armistead
by Wilkinson,
Fisher and
Witherspoon
his Attorneys

UNITED STATES PATENT OFFICE.

WILLIAM E. ARMISTEAD, OF SANDERSVILLE, GEORGIA.

ICE-MAKING APPARATUS.

967,302. Specification of Letters Patent. Patented Aug. 16, 1910.

Application filed September 2, 1909. Serial No. 515,828.

*To all whom it may concern:*

Be it known that I, WILLIAM E. ARMISTEAD, a citizen of the United States, residing at Sandersville, in the county of Washington and State of Georgia, have invented certain new and useful Improvements in Ice-Making Apparatus; and I do hereby declare the following to be a full, clear, and exact description of the invention, such as will enable others skilled in the art to which it appertains to make and use the same.

This invention relates to improvements in apparatus for manufacturing ice, and one of the principal objects of the invention is to provide means whereby an artificial block of ice may be formed without the central core common to manufactured ice, and free from the impurities which are frequently contained in said core and throughout the block, in ice as heretofore manufactured.

Another object of the invention is to provide means whereby the artificial ice manufactured is not only more clear and transparent and free from impurities, as mentioned, but also which may be frozen more quickly, and the more readily harvested, and whereby the ice is formed from opposite sides of each freezing compartment but is separated by a central wall of unfrozen water, so that instead of the formed ice joining centrally, each freezing compartment contains two separate blocks of ice frozen to the desired size blocks, the necessity of sawing the ice into blocks, as in plate plants, being done away with.

With these and other objects in view, the invention consists in the arrangement and combinations of parts hereinafter described and more succinctly pointed out in the claims, and while the invention is not restricted to the exact details shown and described, still for the purpose of disclosure reference is had to the accompanying drawings illustrating a practical embodiment of the apparatus, in which like numerals designate the same parts in the several views and in which—

Figure 1 is a plan view of the apparatus showing an inner and an outer tank, the bottom of the inner tank or freezing compartments being broken away, showing brine conducting pipes, being one arrangement for providing a freezing medium in the outer tank. Fig. 2 is a longitudinal section through the outer tank showing the inner tank and the brine conducting pipes in side elevation. Fig. 3 is a cross section through one of the inner and outer tanks along the line of the inwardly projecting and hollow partitions, and Fig. 4 is a perspective view of one of the interior or freezing tanks.

In freezing tanks as heretofore constructed, the arrangement has been such that the ice is formed from opposite sides of the tank, the two blocks gradually approaching each other and finally congealing centrally; forming a soft core which not only tends to melt the ice more quickly but which also tends to collect and retain impurities in the block of ice. By my arrangement, however, I provide an outer tank constructed of any suitable material for the freezing brine and within this tank there is placed an inner tank, of any desired size, consisting of a plurality of compartments, each compartment being formed by internal hollow partitions open at the bottom, top and outer faces, communicating with the outer tank, but closed at their inner faces and spaced apart to provide for the maintenance of a wall of unfrozen water extending substantially along the central portion of the inner tank.

In the accompanying drawings, 1 designates the outer tank, and within this outer tank is contained what I term the inner or freezing tank, comprising a plurality of compartments 2, formed by the inwardly projecting hollow partitions 3 communicating with the outer tank at the bottom and at one side, and closed against communication with the inner tank by end walls 4. These partitions extend from both sides, and the end walls of each pair are opposed to each other but are spaced apart to form an opening 5 therebetween, and these end walls are preferably provided with a strip of material, $5^a$, such as wood or other suitable material that is a non-heat conductor. This strip of material $5^a$ not only serves to destroy the freezing surface of the end walls, in order to facilitate keeping the central passageway 5 open, but these strips also serve to brace the walls of the hollow partitions 3 against displacement. These strips $5^a$ may be held in place by any suitable means, and in the drawings there are shown sleeves 6 between the end walls, and through these sleeves are passed bolts 7 at the top and bottom which rigidly hold the partitions against displacement.

The inner tank is supported on the bottom by a central beam 8, extending along the bottom of the outer tank, and the sides of the inner tank may be supported by the legs or angle iron brackets 9 carried by the inner tank. The upper open end of the inner tank may be rigidly supported in place by any suitable means, shown in Fig. 2 as a framework of angle iron indicated at 10, it being understood that a suitable removable cover is provided for the tanks.

11 indicate vertical extensions of the beam 8, at each end of the apparatus, and the beam 8 and extensions 11 being disposed central of the tanks, with the extensions disposed between the inner and outer faces respectively of the outer and inner tanks, two separated brine compartments are formed, complete circulation around the tank being prevented by the beams 8 and 11, protecting the central zone or wall of water against freezing.

Any suitable cooling means may be employed and it is immaterial in practice, as to the present invention, whether the cooling brine is introduced into the outer tank from a storage tank or the expansion coils for cooling the brine is placed directly in the outer tank, both means being of common knowledge. For simplicity of illustration, however, in the drawings, I have shown the former means, wherein the freezing medium, such as cold brine, is introduced into the outer tank by any suitable means, conventionally shown as comprising an inlet pipe 13 connected to a header 14 located within a storage or brine cooling tank 15, 16 designating outlet pipes from the outer tank discharging back into the brine storage tank.

The inlet pipe 13 branches off, as at 17, to form the double piping 18 extending along the bottom of the outer tank below the inner tank and provided with jet orifices 15ª disposed therealong, some of which orifices are disposed within the hollow partitions and other of which extend along the bottom of the inner tank, so that the freezing medium freely circulates within the outer tank on each side thereof and finally overflows back into the storage brine.

The freezing medium may be pumped into the outer tank through the header by any suitable pumping apparatus, and it will be also understood that the outer tank is provided with means for withdrawing the cooling brine, so that heated brine may be circulated through the outer tank, after the freezing operation has been discontinued, and it is desired to heat the freezing surfaces in order to loosen the blocks of ice therefrom that they may be readily harvested.

In a system where a plurality of freezing tanks are employed, the tanks are laid side by side, the same being spaced apart and the spaces between the outer tanks may be filled with a non-heat-conducting material, so that a heating medium may be in use in one set of tanks, while in the other sets, the freezing compartments may still be undergoing a freezing operation, each of the freezing compartments being completely insulated units. It will also be understood that in order to keep the water in agitation within the freezing compartments, there may be disposed a perforated pipe extending longitudinally of the freezing compartments, means being provided for forcing air therethrough, whereby the air bubbles passing up through the tank will agitate the water during the freezing process. As any suitable means may be employed, however, for agitating the water, and as any suitable freezing means may be used, it will not be necessary to further refer to these elements as they are old in the art and do not form any essential part of the present invention.

In operation it will be understood that the freezing compartments 2 are filled up with pure water, and with the freezing means shown the freezing brine is introduced into the outer tank, circulating around at each side of the inner tank and up through the hollow partitions 3, the freezing brine overflowing through the overflow pipes 16 before reaching the top of the hollow partitions.

As the freezing brine circulates between the inner and outer tanks, the water within the freezing compartments 2 is acted upon by six freezing surfaces for each compartment, three on one side of the compartment and three on the other side of the compartment, the freezing surfaces consisting of the inside of the inner tanks' walls and the outside of the hollow partitions. The inner ends 4 of the partitions, however, being provided with non-heat conducting strips, and the beams 8 and 11 preventing the brine from flowing completely around the inner tank, these faces do not form freezing surfaces, and as the ice freezes along the walls of the partition and tank there is a wall of water maintained within the space or non-freezing zone 5 between the inner ends of the partitions, and hence two blocks of ice are formed in each compartment with a wall of water therebetween, which wall of water contains all of the impurities and the blocks are formed without a central core.

From the foregoing it will be seen that blocks of pure ice may be formed of any desired size and by which the necessity of expensive machinery for sawing the ice blocks into proper size is dispensed with. Furthermore it will be observed that the large expensive outer tank of a system is done away with, and the size of plant by my system may be enlarged as occasion requires by adding on another section, each outer and inner tank forming a single unit in a system.

Having thus described the invention, what I claim is:—

1. In apparatus for manufacturing ice, a freezing tank having inwardly projecting hollow partitions with opposed inner ends spaced apart and provided with a surface of substantially non-heat conducting material to maintain a wall of unfrozen water therealong, in combination with means for circulating a freezing medium around the exterior of said tank and within said hollow partitions, substantially as described.

2. In apparatus for manufacturing ice, the combination of an outer tank for containing a freezing medium, an inner tank spaced apart from said outer tank and having inwardly projecting opposed hollow partitions, the inner end walls of said hollow partitions being spaced apart and provided with a surface of substantially non-heat conducting material to maintain a dividing wall of unfrozen water centrally of the inner tank, whereby blocks of ice are formed on opposite sides of the tank without a central core, substantially as described.

3. In apparatus for manufacturing ice, the combination with an outer tank, of an inner tank spaced therefrom and provided with a plurality of compartments formed by inwardly projecting hollow partitions communicating with said outer tank and closed at their inner opposed ends, strips of non-heat conducting material disposed within said hollow partitions against the inner end walls thereof, sleeves disposed between the opposed faces of said partitions and bolts passing through said strips and sleeves, the whole arranged to rigidly support said partitions against buckling or displacement, and said partitions being spaced apart endwise to permit of the maintenance of a longitudinal wall of water centrally of said inner tank, whereby two blocks of ice are formed in each compartment without a central core, substantially as described.

4. In apparatus for manufacturing ice, the combination of an outer tank for containing a freezing medium, a central base beam running longitudinally on the inside of the outer tank at the bottom thereof, and provided with vertical extensions at each end, and an inner tank resting on said base beam and spaced apart from said outer tank, said inner tank being provided with inwardly projecting opposed hollow partitions, the inner end walls of said hollow partitions being spaced apart to contain a longitudinal wall of unfrozen water, and said vertical extensions separating the ends of said inner and outer tanks, whereby said base beam and said vertical extension prevent the circulation of the freezing medium entirely around said inner tank, and provides non freezing surfaces in the plane of the column of unfrozen water.

In testimony whereof, I affix my signature, in presence of two witnesses.

WILLIAM E. ARMISTEAD.

Witnesses:
HENRY M. KIRKE,
MACK SESSIONS.